April 20, 1937. E. E. HEWITT 2,077,929

RAILWAY VEHICLE BRAKE SYSTEM

Filed June 26, 1935 4 Sheets-Sheet 1

INVENTOR
ELLIS E. HEWITT
BY Wm. M. Cady
ATTORNEY

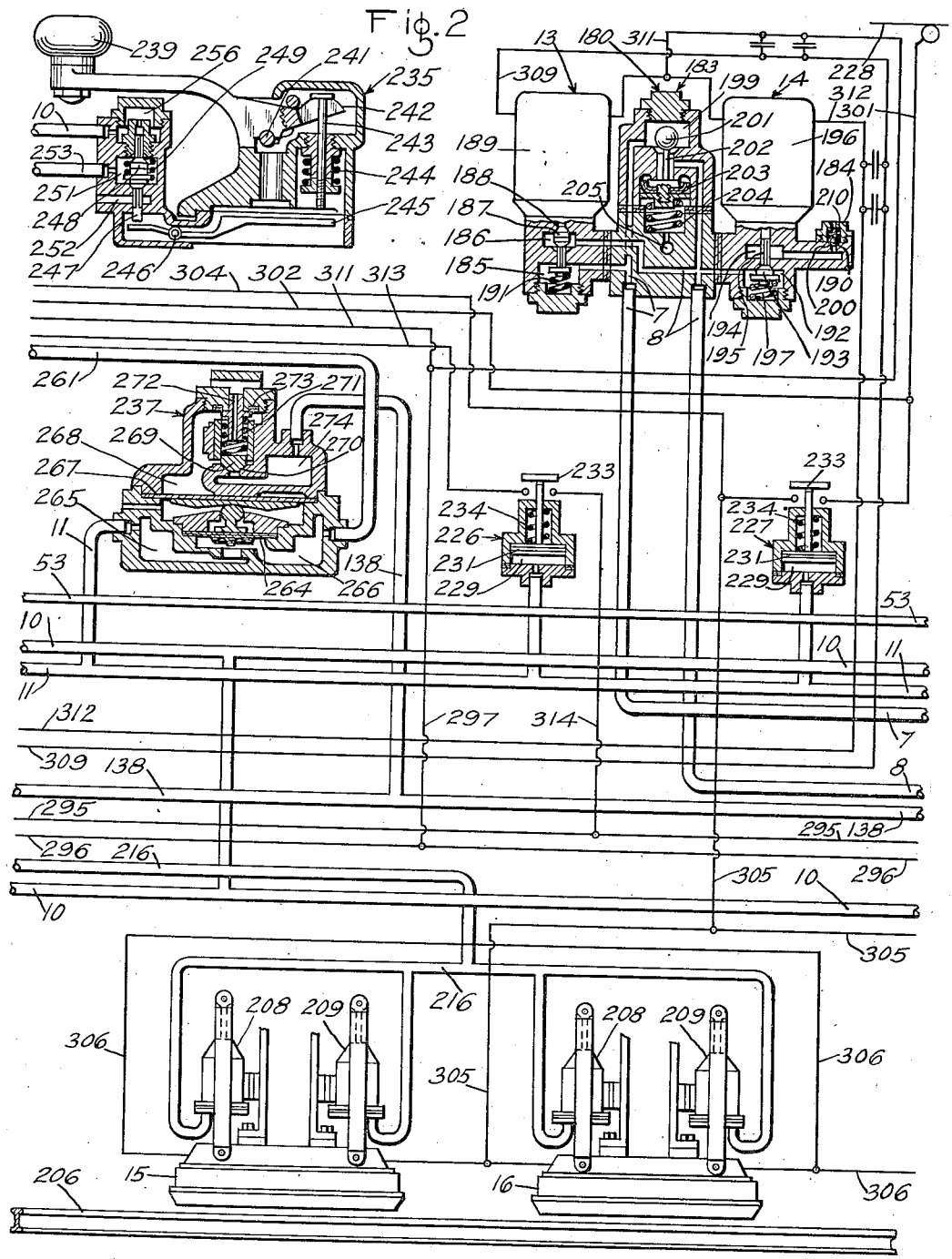

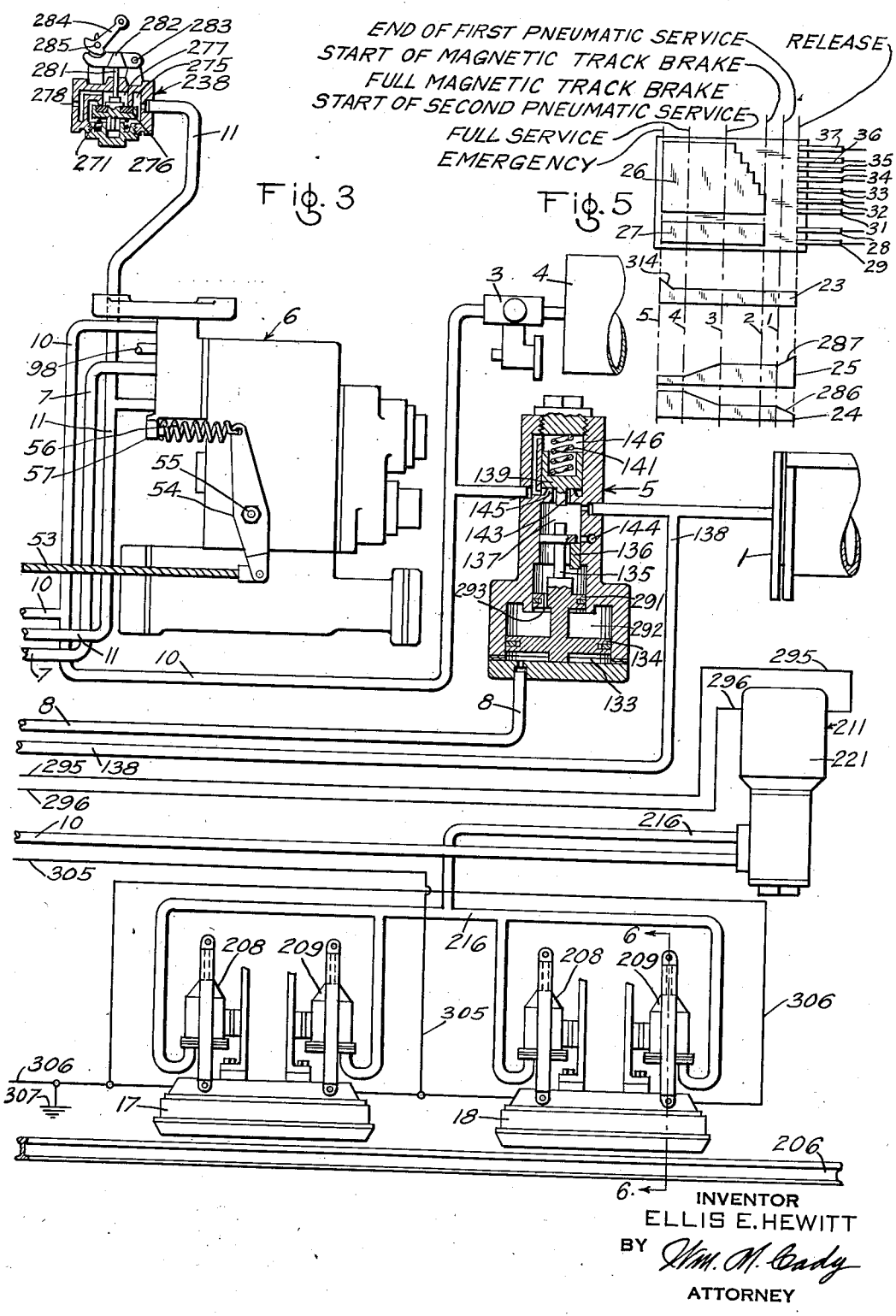

April 20, 1937.    E. E. HEWITT    2,077,929
RAILWAY VEHICLE BRAKE SYSTEM
Filed June 26, 1935    4 Sheets-Sheet 4
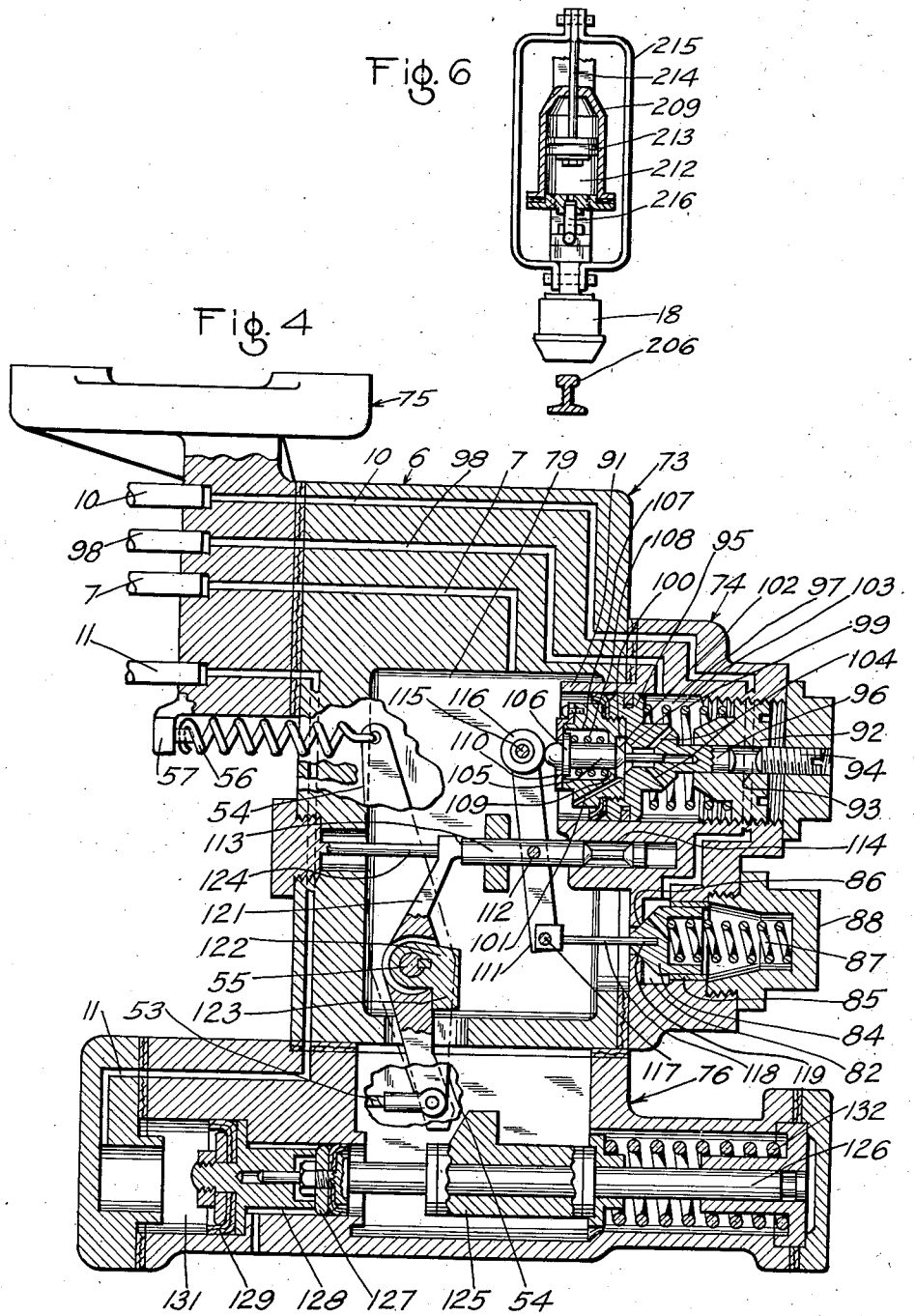
INVENTOR
ELLIS E. HEWITT
BY Wm. H. Cady
ATTORNEY Patented Apr. 20, 1937

2,077,929

UNITED STATES PATENT OFFICE 2,077,929

RAILWAY VEHICLE BRAKE SYSTEM

Ellis E. Hewitt, Edgewood, Pa., assignor to The Westinghouse Air Brake Company, Wilmerding, Pa., a corporation of Pennsylvania Application June 26, 1935, Serial No. 28,389

14 Claims. (Cl. 303—3)

My invention relates to braking equipment for railway vehicles and is particularly adapted for use in high speed traction vehicles.

In the operation of high speed trains and traction vehicles it is desirable to provide a brake equipment having ample braking capacity to take care of the most rigid requirements the equipment may be called upon to meet. It is well known that for a given braking pressure friction type brakes are less effective in retarding the motion of a vehicle at high speed than at low speed because the coefficient friction between the rubbing parts is lower at high speed than at low speed. In order to bring a vehicle to a stop quickly it has been the usual practice for an operator to apply the brakes with a high degree of braking pressure at the high speeds, and, as the speed of the vehicle decreases, to so operate the brakes as to cause the braking pressure to be decreased in such manner that the vehicle is brought to a stop quickly and smoothly without dangerous shock or skidding of the wheels.

Because of the difficulty of properly reducing the braking pressure at the desired rate it becomes desirable, in many instances, to provide a retardation controller for regulating the degree of application of the brakes. This may comprise an inertia responsive device, such as a pendulum, that assumes various positions in accordance with variations in the deceleration of the vehicle, and is adapted, by means of electric circuits, or otherwise, to control the degree of application of the brakes.

A desirable type of brake equipment to use with high speed traction vehicles and railway trains is one employing a brake for providing braking force to the wheel of a vehicle and a braking effect applied directly to the rails. The brake for applying a braking force to the wheels of the vehicle may be the well known fluid pressure brake, an electric brake or a combination of the two, while the track brake may be a magnetic brake controlled either by fluid pressure, electrical means or by a combination of both means. In such an equipment a greater braking effect can be produced by operation of both the wheel and track brake than can be obtained by operation of either of them alone. It is an object of my invention to provide braking equipment for railway vehicles in which a plurality of braking means are provided that are controlled from a common brake controlling device in accordance with a desired degree of braking.

It is another object of my invention to provide a retardation controlled braking system in which the braking pressure is automatically controlled by a retardation controller that is manually adjusted to provide a desired degree of retardation during a service operation of the brakes, and that is automatically adjusted to provide a greater rate of retardation upon an emergency operation of the brakes.

It is a further object of my invention to provide a retardation controlled braking system in which electric braking means and fluid pressure braking means are employed, and in which deadman devices are employed for causing application of the brakes.

It is a still further object of my invention to provide a retardation controlled braking system which is provided with safety control mechanism for automatically applying the brakes to effect a rate of retardation of the vehicle, upon failure of safety control pipe pressure, that is greater than the rate of retardation caused by normal service application of the brakes.

Other objects and advantages of my invention will be apparent from the following description of one preferred embodiment thereof when taken in connection with the accompanying drawings, in which Figs. 1, 2 and 3 when placed side by side from left to right, together constitute a diagrammatic view illustrating circuits and apparatus comprising one preferred embodiment of my invention.

Fig. 4 is a diagrammatic sectional view of the self-lapping brake valve device shown in Fig. 3.

Fig. 5 is a diagrammatic development of the brake valves and cams constituting portions of the brake valve device shown in Fig. 1 and, Fig. 6 is a view partly in section through the track shoe raising cylinders shown in Figs. 2 and 3.

Figure 1:
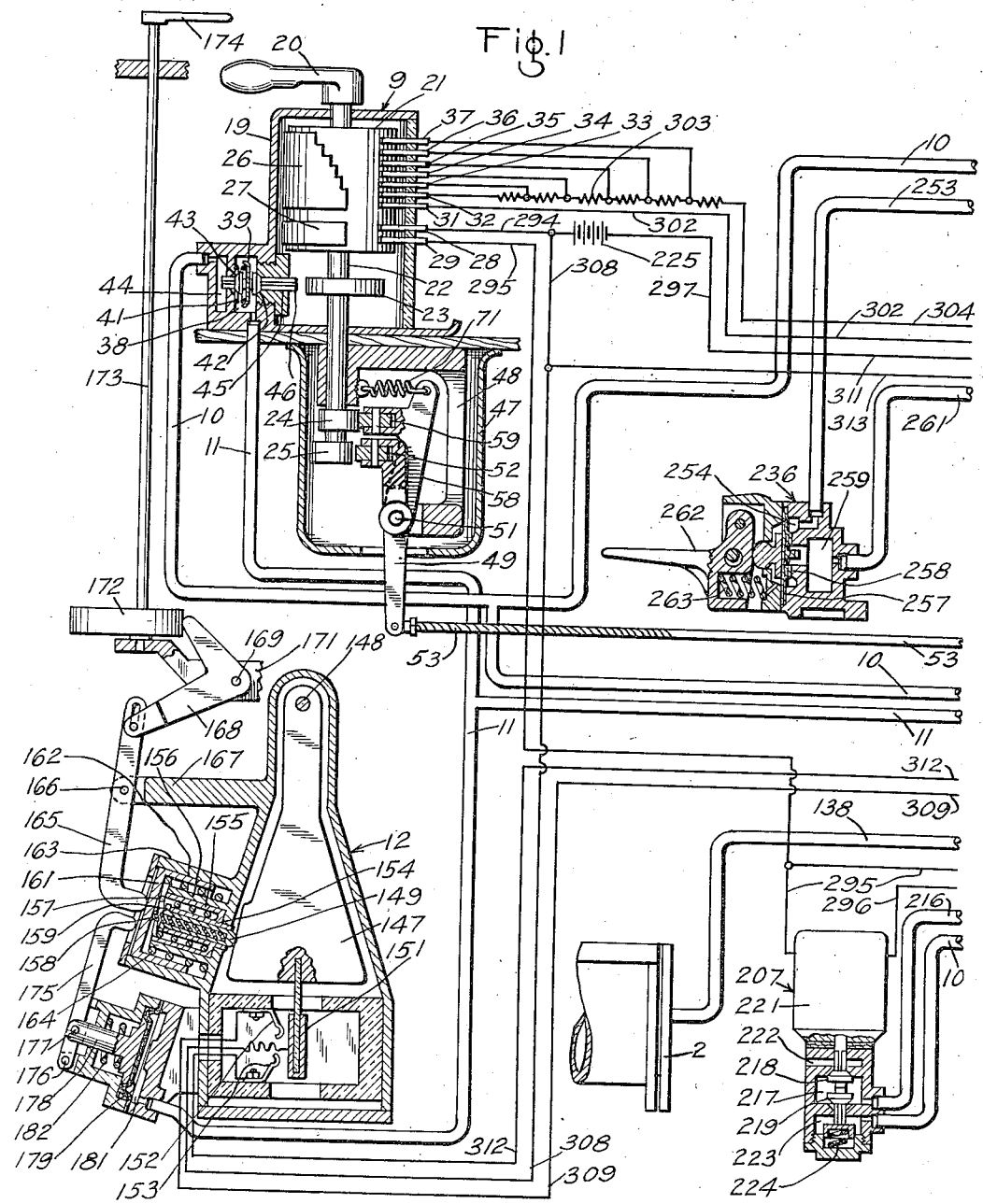

Referring to the drawings, and more particularly to Figs. 1, 2 and 3 thereof, in which brake apparatus is illustrated as employed in accordance with my invention on two train units, the apparatus comprises brake cylinders 1 and 2 by means of which the brakes are applied upon the flow of fluid under pressure thereto as supplied by a feed valve device 3 from a main reservoir 4, as controlled by a relay valve device 5. The relay valve device 5 is governed in accordance with the operation of a self-lapping brake valve device 6 for controlling the supply of fluid under pressure to and from the piston chamber 133 of the relay valve device 5, through the supply pipe 7 and the application and release pipe 8, either in accordance with the operation of the brake controlling device 9 or in accordance with a predetermined reduction in pressure in a safety control pipe 11. A retardation controller 12 is provided for controlling the degree of application of the fluid pressure brake to limit the rate of retardation of the vehicle to a desired value by operation of the magnet valve devices 13 and 14 that are interposed between the supply pipe 7 and the application and release pipe 8 that leads from the brake valve device 6 to the relay valve device 5.

The brake equipment also includes magnetic track brake mechanism employing the track shoes 15, 16, 17 and 18 together with certain auxiliary devices which will be later explained.

The brake controlling device 9 comprises a casing 19 enclosing a contact carrying drum 21, carried on a shaft 22, provided with a handle 20 for manual operation thereof. A cam 23 is carried by the shaft 22 within the casing 19 for effecting emergency application of the brakes and cams 24 and 25 are provided at the lower end of the shaft 22 for controlling the service operation of the fluid pressure brake in accordance with the position of the handle 23.

The contact carrying drum 21 is provided with conducting segments 26 and 27. The conducting segment 27 is adapted to engage the contact members 28 and 29 to control the lowering and raising of the magnetic track shoes into and out of engagement with the track rail, and the conducting segment 26 is adapted to engage successively the contact members 31, 32, 33, 34, 35, 36 and 37 to control the degree of energization of the windings of the track shoe brakes in a manner to be later explained.

In the lower part of the casing 19 an emergency valve chamber 38 is provided that is in constant communication with the safety control pipe 11 that is supplied with fluid under pressure from the main reservoir pipe 10. A double beat emergency valve 39 is provided in the chamber 38 and is urged by a spring 41 to the seat 42 and away from the seat 43 thus effecting communication from the main reservoir pipe 10 to the safety control pipe 11 through the chamber 44 and the emergency valve chamber 38, and closing communication from the safety control pipe 11 to the atmosphere through safety valve chamber 38 and the exhaust 45. The emergency valve 39 is provided with a stem 46 that is adapted to be engaged by the cam 23 when the handle 20 is placed in the pneumatic emergency position to force the valve 39 from its seat 42 and against its seat 43, against the pressure of the spring 41, thus closing communication between the main reservoir pipe 10 and the safety control pipe 11 and effecting communication from the safety control pipe 11 to the atmosphere through the exhaust port 45.

The cams 24 and 25 on the lower end of the shaft 22 are positioned within a casing 47 that contains a supporting bracket 48 upon which a lever 49 is pivotally mounted by the pin 51. The upper end of the lever 49 carries a roller 52 that is adapted to engage the cam 25 the lower end of the lever being pivotally attached to one end of a cable 53, the other end of which is attached to the lower end of an operating lever 54 of the brake valve device 6 shown in Fig. 3, that is attached to a shaft 55 and is connected at its upper end to a spring 56 one end of which is attached to a lug 57 for biasing the lever 54 and the shaft 55 in a counterclockwise direction.

Within the casing 47 of the brake valve device 9 an auxiliary lever 58 is provided that is also pivoted upon the pin 51 and is provided with a roller 59 that is adapted to engage the cam 24 that is connected at its upper end to a spring 71 that is adapted to bias the lever 58 in a counterclockwise direction to the extent permitted by the cam 24. The cam 24 is so arranged that when the operating lever 54 of the brake valve device 6 is in its release position, in which position the spring 56 exerts its least counterclockwise bias upon the lever 54, the lever 58 is held in its extreme clockwise position by the cam 24 thus stressing the spring 71 to its maximum bias. When the lever 20 is moved from its release position to effect an application of the brakes the cam 25 effects movement of the lever 49 and of the cable 53 to move the operating lever 54 of the brake valve device 6 in a clockwise direction to increase the force on the spring 56. Simultaneous with this movement, the cam 24 moves away from the roller 59 and permits the lever 58 to move, under the influence of the spring 71, in a counterclockwise direction to decrease the pressure between the roller 59 and the cam 24 as the pressure between the cam 25 and the roller 52 is increased. Since, however, the auxiliary lever 58 engages the lug 72 on the lever 49, the spring 71 becomes effective to bias the lever 49 in a counterclockwise direction in opposition to the bias of the spring 56. As the bias on the spring 56 is increased, the bias on the spring 71 is decreased so that the resultant effect of the two rollers 59 and 52 on the cams 24 and 25, respectively, substantially equalizes one another so that the force necessary to move the lever 20 remains substantially constant and is independent of the position of the shaft 22.

The brake valve device 6 best shown in Fig. 4 of the drawings may correspond to that disclosed and claimed in United States Patent application of Ewing K. Lynn and Rankin J. Bush for improvements in Brake valve devices, Serial No. 569,158, filed October 16, 1931 and assigned to the same assignee as this application.

The brake valve device 6 comprises a main body portion 73, a valve portion 74, a bracket portion 75 and an emergency portion 76. The valve portion, the main body portion, and the emergency portion together define a pressure chamber 79 that is in open communication through the supply passage and pipe 7, and the application and release pipe 8 with the piston chamber 133 of the relay valve 5. The magnet valve devices 13 and 14 are interposed between the pipes 7 and 8 to regulate the pressure of fluid acting on the piston of the relay valve 5 in accordance with the rate of retardation of the vehicle.

The valve casing portion 74 is provided with a supply valve chamber 82 to which a feed valve device 3 of the usual type supplies fluid under pressure at a reduced pressure from the main reservoir 4 through the main reservoir pipe 10. A supply valve 84 is contained within the supply valve chamber 82 and is slidably disposed within the bushing sleeve 85 to engage a seat 86 carried by the valve portion of the casing. The valve 84 is subject to the pressure of a spring 87 one end of which engages a valve and the other end of which engages a nut 88 screw-threadedly attached within a bore in the valve portion of the casing.

The valve portion or section 74 of the casing is also provided with a cylinder 91 which is open at one end to the pressure chamber 79, the other end of the cylinder being closed by an adjusting member 92 screw-threadedly attached within a bore in the casing section. The adjusting member 92 is provided with a central bore 93 which at its outer end is adapted to receive a screw-threaded cap member 94.

Operatively mounted in the cylinder 91, adjacent to its open end is a movable abutment in the form of a piston 95 having a stem 96 which is slidably guided by the adjustable member 92 within the inner end of the bore 93. At one side of the piston 95 is a chamber 97 which is constantly open to the atmosphere through passage and pipe 98. A coil spring 99 is contained in the chamber 97 and is interposed between and engages the inner face of the piston 95 and the inner face of the adjusting member 92.

A release valve chamber 100 is provided within the piston 95 and is in open communication with the pressure chamber 79 through a passage 101. A release valve 102 is contained within the valve chamber 100 and is adapted to seat on a valve seat 103 formed on the piston and which is operative to control communication between the valve chamber 100 and the chamber 97 through connecting passages 104 in the piston stem 96. The release valve is provided with a stem 105, the small end of which slides within a bore in the stem of the piston 95 and the larger end of which is provided with a collar 106 which slidably engages the piston within a central bore 107 and is subject to the pressure of the release valve spring 108 interposed between the engaging collar 106 and an annular flange 109 on the piston. Outward movement of the release valve relative to the piston 95 is limited by the collar 106 which engages a stop plate 110 that is secured to the piston 95.

A mechanism is provided for controlling the operation of the supply valve 84 and the release valve 102 comprising spaced levers 111 that are pivotally mounted intermediate their ends on a pin 112 supported in a plunger 113 that is slidably guided within a bore 114 in the casing portion 74.

The upper ends of the spaced levers 111 are connected together by a pin 115 which is loosely mounted within a roller 116 that is adapted to operatively engage the outer end of the release valve stem 105. The lower ends of the spaced levers 111 are connected together by a pin 117 on which one end of an operating rod 118 is pivotally mounted, the opposite end of the rod operatively engaging the supply valve 84 within a recess 119 formed in its face.

For the purpose of operating the plunger 113 toward the right there is provided an operating lever 121 which is loosely mounted on the shaft 55 that is supported in the main casing section 73. Secured to the shaft 52 is an intermediate lever 122 provided with a lug 123 which overrides the lever 121 so that when the shaft 55 is rotated in a clockwise direction the lug 123 engages the lever 121 to cause it to move the floating pivot carrier or plunger 113 to the right. A stop 124 is provided to limit the backward movement of the lever 121.

When the shaft 55 and the lever 121 are in their release positions as shown in Fig. 4 the spring 87 forces the supply valve 84 to its seated position and the spring 108 forces the release valve 102 toward the left to its unseated position. It will be appreciated that the force of the release valve spring 108 is less than the force of the supply valve spring 87 which is less than the force of the regulating spring 99.

The emergency portion 76 of the brake valve device 6 is provided with a block 125 secured to a rod 126. One end of the rod 126 is connected to a piston 127 positioned within the piston chamber 128. For normally maintaining the rod 126 and the block 125 in its illustrated position a piston 129 is provided within a piston chamber 131 the piston chamber being connected through passage 11 to the safety control pipe 11. So long as the pressure within the piston chamber 131 and within the safety control 11 is maintained at its normal value the piston 129 is urged against the piston 127 with sufficient force to maintain the rod 126 and the block 125 in their illustrated positions against the pressure of a spring 132.

The relay valve device 5 comprises a casing having a piston chamber 133 that is constantly connected to the application and release pipe 8, and containing a piston 134 which is adapted, through the medium of a stem 135, to operate a slide valve 136 that is operatively connected to the stem and contained in a valve chamber 137, that is in constant communication with the brake cylinders 1 and 2 through a brake cylinder pipe 138. Also contained in the casing is a fluid pressure supply valve 139 which is subject to the pressure of a spring 141 and which is provided with a stem 143 that is adapted to be operatively engaged by the end of the piston stem 135.

The relay valve device 5 is shown with the relay piston 134 and the slide valve 136 in their extreme upper or brake releasing positions. With the slide valve 136 in this position the valve chamber 137, and consequently the brake cylinders 1 and 2 are in communication with the atmosphere through an exhaust passage 144. With the piston 134 in release position the stem 135 will be out of engagement with the end of the supply valve stem 143 so that the pressure of the spring 141 will maintain the supply valve 139 seated against its seat rib 145 thereby maintaining communication closed from the chamber 146 that is constantly connected to the main reservoir 4 through a main reservoir pipe 10.

The retardation controller 12 comprises a casing enclosing an inertia device or pendulum 147 that is pivotally supported on the pin 148 and positioned adjacent a spring pressed plunger 149 that resists the movements of the pendulum 147 forwardly from its vertical position, and to the lower end of which is mounted a movable contact member 151 for engaging the contact members 152 and 153 to control the magnet valve devices 13 and 14, respectively. A plunger 149 extends through a cylindrical bore formed in the inner wall 154 of a guide member that is also provided with an outer cylindrical wall 155 that engages an outwardly extending cylindrical guide wall 156 of the casing member. A spring 157 is provided between the walls 154 and 155 of the guide member for urging the guide member inwardly, and a spring 158 is provided within a bore in the plunger member 149 for urging the plunger 149 inwardly toward the pendulum 147 to a position such that the flange 159 on the outer end of the plunger member engages the end of the cylindrical wall 154 of the guide member. The outer end of the springs 157 and 158 engage a cap member 161 that is provided with an inwardly extending cylindrical guide flange 162 for engaging the inner surface of an outwardly extending cylindrical wall 163 extending from the retardation controller casing. A spring 164 is provided surrounding the cylindrical wall 156 the inner end of which is in engagement with the casing wall of the retardation controller and the outer end of which engages the cap member 161 to urge it outwardly.

For manually adjusting the setting of the retardation controller a lever 165 is provided, the lower end of which is in engagement with the cap member 162, and is pivotally supported on the pin 166 mounted in an arm 167 extending outwardly from the casing of the retardation controller. The upper end of the lever 165 is operatively attached to a bell crank lever 168 that is pivotally supported on the pin 169 carried by a portion of the car frame 171, the upper end of which is operatively engaged by a cam 172 attached to a shaft 173, upon the upper end of which a manually controlled lever 174 is provided. By movement of the lever 174 the setting of the retardation controller device 12 is adjusted by adjusting the position of the cap member 162 against the force of the springs 164, 157 and 158. The further the cap member 162 is forced toward the right the greater will be the force required by the pendulum device 147 to cause engagement of the movable contact member 151 with the contact members 152 and 153 thus permitting a greater rate of retardation of the vehicle.

Upon movement of the pendulum 147 toward the left against the force of the plunger 149 sufficiently to permit engagement of the contact members 151 and 152 a circuit is completed causing the energization of the winding of the application magnet valve device 13. Upon the application of a sufficiently greater force the pendulum 147 will move the plunger 149 further toward the left until the contact member 151 engages a contact member 153 to effect the closing of a circuit causing energization of the winding of the release magnet valve device 14. The position of the cap 162, as explained above, determines the force of the pendulum required against it to effect engagement of the contact member 151 with the contact members 152 and 153.

In order to provide for automatically changing the setting of the retardation controller upon a reduction in pressure in the safety control pipe 11 a lever 175 mounted on the pivot pin 176 is provided having its upper end in engagement with the outer face of the cap 162, and pivotally connected by a pin 177 at a point intermediate its ends to a stem 178 that is in engagement with a diaphragm 179 that forms one wall of a pressure chamber 181. The diaphragm 179 is subject on one side to the force of a spring 182 and on the other side to the pressure within the chamber 181 which corresponds to the pressure within the safety control pipe 11. When the pressure within the safety control pipe 11, and within the chamber 181, is insufficient to overcome the pressure of the spring 182 this spring becomes effective to force the lever 175 toward the right against the bias of the springs 157, 158 and 164 thus increasing the force required by the pendulum 147 against the spring 158 to effect engagement of the contact member 151 with the contact members 152 and 153.

Upon operation of the retardation controller the supply of fluid under pressure to the piston chamber 133 of the relay valve device 5 is controlled in part by the magnet valve portion 189 comprising an application magnet valve device 13 and a release magnet valve device 14 that are controlled by the retardation controller 12, a check valve device 183 and a pressure retaining valve device 184. The magnet valve device 13 controls the flow of fluid under pressure from the brake valve device 6 through the supply pipe 7, the application and release pipe 8, to the piston chamber 133 of the relay valve device 5.

The application magnet valve device 13 comprises a casing enclosing a chamber 185 that is in constant communication with the pipe and passage 7 and an application valve chamber 186 that is in constant communication through a passage and pipe 8 with the piston chamber 133 of the relay valve device 5 and which contains an application valve 187 that is connected by its stem 188 to an operating magnet 189. A spring 191 is provided in the chamber 185 for urging the valve 187 to its seat.

The release magnet valve device 14 comprises a casing enclosing a release valve chamber 192 that is in constant open communication with the passage and pipe 8, and contains a release valve 193 for controlling communication between the release valve chamber 192 and an outlet chamber 194. The valve 193 is provided with a valve stem 195 that is operatively connected to be actuated by a magnet 196, and a spring 197 is provided in the release valve chamber 192 for urging the release valve 193 to its seat. The chamber 194 is in communication with the atmosphere through a pressure retaining valve device 182 that is effective to prevent the release of fluid under pressure from the chamber 194 to the atmosphere when the pressure in the chamber 194 is below a predetermined low value for which the valve device 182 is set.

The check valve device 183 comprises a casing structure which defines a valve chamber 199 that encloses a ball valve 201 supported on a stem 202 that is carried by a piston 203 in a cylinder below the valve chamber 199. The piston 203 is biased upwardly by a spring 204 to maintain the ball valve 201 in its unseated position. The lower side of the piston 203 is in communication with the atmosphere through an outlet port 205.

Mechanism is provided for operating the magnet track shoes 15 and 16 into and out of engagement with the track rail 206 and comprises a track shoe lifting magnet valve device 207 and the raising cylinders 208 and 209 associated with each of the magnetic track shoes. Similar mechanism including the track shoe lifting magnet valve device 211 is provided for raising and lowering the magnet track shoes 17 and 18.

The magnet track shoe cylinders 208 and 209 are each provided with pressure chambers 212 (see Fig. 6) containing a movable piston 213 that is connected by a stem 214 to the upper end of a frame structure 215 the lower end of which is connected to the magnet track shoe. The piston 213, frame 215 and the track shoe are moved downwardly into engagement with the track rail 206 by gravity, and are moved upwardly from the track rail upon the supply of fluid under pressure to the piston chamber 212 from the main reservoir pipe 10 through the pipe 216 as controlled by one of the track shoe lifting magnet valve devices 207 or 211.

The magnet valve devices 207 and 211 are alike in construction and each valve device comprises a casing providing a valve chamber 217 containing a release valve 218 and an application valve 219 the valve 218 having a valve stem extending upwardly to be actuated by a magnet 221. The release valve 218 controls communication from the piston chambers 212 of the track shoe raising cylinders to the atmosphere through the exhaust passage 222, and from the main reservoir pipe 10 to the piston chambers 212 through chambers 213 and 217. A spring 224 is provided in the lower portion of the casing for urging the valves 218 and 219 upwardly to effect the seating of the release valve 218 and the unseating of the application valve 219. When the application valve 219 is unseated the piston chamber 212 of the track shoe raising cylinders are connected to the main reservoir pipe 10 through pipe 216 and chambers 217 and 223. The apparatus for raising and lowering the track shoes 17 and 18 upon operation of the track shoe lifting magnet valve device 211 is a duplicate of that employed to raise and lower the track shoes 15 and 16 and is therefore not described in detail.

The magnet 221 of the track shoe lifting magnet valve devices 207 and 211 are energized from a source of energy such as the battery 225 to effect the lowering of the magnet track shoes into engagement with the rail, either upon engagement of the conducting segment 27 of the controller 9 with the contact members 28 and 29, or upon operation of an automatic safety control switch 226 to its circuit closing position upon a reduction in safety control pipe pressure below a predetermined value. A safety control automatic pressure switch 227 is also provided for automatically completing a circuit from the overhead conductor 228 to ground through the magnetic track shoe upon a predetermined reduction in safety control pipe pressure, independently of the operation of the controller 9.

The pressure controlled automatic switch devices 226 and 227 are alike in construction and each comprises a casing having a piston chamber 229 that is in communication with the safety control pipe 11, and that contains a piston 231 that is provided with a stem 232 for carrying a movable contact member 233. A spring 234 is provided above the piston 231 for urging it downwardly. So long as the pressure in the piston chamber 229 is greater than the downward pressure of the spring 234 the contact member 233 remains in a circuit interrupting position, while upon decrease in the pressure in the piston chamber 229 and in the safety control pipe 11 below a predetermined amount, the spring 234 will move the piston 231 and the contact member 233 downwardly to a circuit closing position.

The braking equipment also includes apparatus for effecting deadman operation which comprises the controller handle device 235, and a diaphragm foot valve device 236 for effecting an emergency application of the brakes upon a reduction of pressure in the safety control pipe 11 below a predetermined value. A cut-off valve device 237 is provided for preventing the operation of the deadman feature if the brakes have been applied sufficiently to provide a predetermined brake cylinder pressure. A conductor's valve device 238 is also provided for venting the safety control pipe 11 to effect an emergency application of the brakes. A reduction in pressure in the safety control pipe 11 for any cause effects an emergency application of the pneumatic brake through operation of the emergency portion of the brake valve device 6, and an emergency application of the magnetic track shoe brake through operation of the automatic pressure controlled switch devices 226 and 227 in a manner to be later explained.

The controller handle device 235 may comprise a handle 239 fastened on the pin 241 in the controller handle train and provided with outwardly extending bifurcated fingers 242 that engage the head of a pin 243 to move the pin upwardly as the handle 239 is pressed down, thus raising the pin 243 against the pressure of a spring 244 to bring it out of engagement with the lever 245. The lever 245 is pivotally mounted on a pin 246 in the casing of the controller handle device and its shorter end engages a valve stem 247 that extends upwardly to a double beat pilot valve 248 that is pressed downwardly by a spring 249 in the valve chamber 251. When the pin 243 is raised from engagement with the lever 245 the spring 249 forces the pilot valve 248 to its lower seated position to close communication between an exhaust port 252 and the valve chamber 251, that is in open communication through the pipe 253 with the chamber 254 in the foot valve device 236, and effects communication between the valve chamber 251 and a chamber 256 that is constantly connected to the main reservoir pipe 10.

The foot valve device 236 comprises a casing provided with the aforesaid chamber 254 and with a valve 257 that is adapted to engage the seat rib 258 to control communication between the chamber 254 and a chamber 259 that is in open communication with a pipe 261 that is connected to the cut-off valve device 237. When pressure is maintained on the foot pedal 262 the valve 258 is held in its seated position closing communication between the pipe 253 and 261. When the pressure of the foot pedal 262 is released the spring 263 forces the foot pedal upwardly unseating the valve 257.

The cut-off valve device 237 is provided with a valve 264 for controlling the flow of fluid under pressure from a supply valve chamber 265 that is in open communication with the safety control pipe 11 to a chamber 266 that is in open communication with the chamber 259 of the foot valve device through pipe 261.

The cut-off valve device is also provided with a diaphragm 267 that is adapted to force the valve 264 to its seat when the pressure in the chamber 268 above the diaphragm 267 exceeds that acting upon the under side of the valve 264. The pressure above the diaphragm 267 is controlled by a control valve 269 which is urged toward its lower seat by a spring 271 and toward an upper seat 273 by the pressure below the valve.

With the control valve 269 positioned against its lower seat, the chamber 268 above the diaphragm 267 is in communication with the atmosphere through a passage 272 past the open upper seat 273 of the valve 269. A chamber 274 below the valve 269 is in constant communication with the brake cylinder pipe 138.

When the pressure within the chamber 274, which corresponds to the brake cylinder pressure, reaches a predetermined amount, the control valve 269 is forced upwardly from its seat 270 against its upper seat 273 cutting off communication between the chamber 268 and the atmosphere and effecting the supply of fluid under pressure at brake cylinder pressure to the chamber 268. When the pressure in the chamber 268 above the diaphragm 267 reaches a predetermined value the valve 264 will be seated, thus closing communication between the chambers 265 and 266 and preventing the flow of fluid under pressure from the safety control pipe 11 to the chamber 259 in the foot valve device 236.

The conductor's valve device 238 may comprise a casing containing a chamber 275 that is in constant communication with a safety control pipe 11. A valve 276 is contained within the chamber 275 for controlling communication between the chamber 275 and a chamber 277 that is in communication with the atmosphere through the exhaust port 278. The valve 276 is normally biased upwardly to its seated position by a spring 277 thus closing communication between the safety control pipe 11 and the atmosphere. A valve stem 281 extends upwardly from the valve 276 and engages a valve lever 282 pivoted on a pin 283 mounted on the valve casing. An operating lever 284 is pivotally mounted on a pin 285 carried on a bracket extending upwardly from the valve casing and which, when moved in either direction forces the valve lever 282 downwardly unseating the valve 276 and permitting fluid under pressure to be vented from the safety control pipe 11 to the atmosphere through the exhaust port 278.

The operation of the braking system will now be described. The various parts of the apparatus are illustrated in their brake release position, and in this position the equipment is charged by the flow of fluid under pressure from the main reservoir 4 past the feed valve device 3 to the main reservoir pipe 10 at a pressure determined by the setting of the feed valve device. From the main reservoir pipe 10 fluid under pressure flows to the control valve chamber 146 of the relay valve device 5 and to the application valve chamber 82 of the brake valve device 6.

If pressure is released on the lever 262 of the foot valve device 236 and maintained on the handle 239 of the controller handle device 235, the safety control pipe 11 will be charged by the flow of fluid under pressure from the main reservoir pipe 10 through chambers 256 and 251 of the controller handle device, pipe 253, chambers 254 and 259 of the foot valve device 236, and through pipe 261, through chambers 266 and 265, past the valve 267 of the cut-off valve device 237, to the safety control pipe 11. The safety control pipe 11 is also charged by the flow of fluid under pressure from the main reservoir pipe 10 through the chambers 44 and 38, past the unseated emergency valve 39 in the brake valve device 9. Fluid under pressure also flows from the main reservoir pipe 10 through the track shoe lifting magnet valve devices 207 and 211 to the piston chamber 212 of the track shoe raising cylinders to raise the track shoes 15, 16, 17 and 18 from engagement with the track rail 206.

Fluid under pressure flows from the safety control pipe 11 to the piston chamber 131 of the emergency portion of the brake valve device 6 forcing the piston 129, the rod 126 and block 125 toward the right against the pressure of the spring 132. Fluid under pressure also flows from the safety control pipe 11 to the piston chambers 229 of the automatic pressure control switch devices 226 and 227, thus raising the piston 231 and the contact members 233 to their circuit interrupting positions. Fluid under pressure also flows from the safety control pipe 11 to the chamber 181 of the retardation controller to force the diaphragm 179 and the stem 178 toward the left against the pressure of the spring 182, thus relieving the pressure of the lever 175 against the cap member 161 and permitting the setting of the retardation controller to be determined entirely by operation of the lever 174.

Pressure must now be maintained, either on the foot valve device lever 262 or on the handle 239 of the controller handle device 235, to prevent fluid under pressure from flowing from the safety control pipe 11 to the atmosphere through the cut-off valve device 237, the pipe 261, the foot valve device 236, the pipe 253, the pilot valve portion of the controller handle device 286 and the exhaust passage 252 to effect an emergency application of the brakes.

If the operator wishes to apply the brakes, the handle 20 of the brake controlling device 9 is moved from its release position. Upon the initial movement of the handle from its release position, that is from the position marked release to the position marked with the vertical dot and dash line I in Fig. 5, the sloping surface 286 of the cam 24 moves outwardly against the roller 52 (Fig. 1) in the upper end of the lever 49, thus causing a clockwise movement of the lever 49 and of the control lever 54 of the brake valve device 6 sufficiently to effect a partial pneumatic operation of the brakes. As the sloping surface of the cam 25 moves outwardly against the roller 52 causing the lever 54 of the brake valve device 6 to move in a clockwise direction against the bias of the spring 56 thus increasing its tension, the sloping surface 287 of the cam 25 moves inwardly from the roller 59 permitting the lever 58 to move toward the left to decrease the tension on the spring 71. Thus, as the pressure of the cam 25 against the roller 52 increases due to the increasing tension of the spring 56 the pressure between the cam 24 and the roller 59 decreases due to the decreasing tension of the spring 71 so that their joint effect is to neutralize each other and maintain a constant bias on the shaft 22 of the brake controller device 9.

Upon movement of the lever 54 of the brake valve device 9 in a clockwise direction the shaft 55 and the operating lever 121 are likewise moved in a clockwise direction to force the plunger 113 toward the right. The first portion of this movement effects a compression of the release valve spring 108 and forces the release valve 102 to its seat, closing communication between the pressure chamber 79 and the atmosphere through passages 101, 104 and 98. Further movement of the plunger 113 toward the right causes the spaced levers 111 to pivot about their upper ends, further movement of the roller 116 being prevented by the stiffness of the regulating spring 99, and causing the rod 118 to force the supply valve 84 against the compression of the supply valve spring 87 to open communication between the main reservoir pipe 10 and the pressure chamber 79 through passage 10 and supply valve chamber 82, thus supplying fluid under pressure from the main reservoir 4 through the main reservoir pipe 10, the brake valve device 6, the supply pipe 7, the magnet valve portion 180 and the application and release pipe 8 to the piston chamber 133 of the relay valve device 5.

The amount of fluid under pressure supplied to the pressure chamber 79 of the brake valve device 9, and to the piston chamber 133 of the relay valve device 5, is dependent upon the amount of movement of the operating lever 121, and of the plunger 113, from their release positions. While the pressure within the pressure chamber 79 increases, due to the flow of fluid under pressure thereto through the supply valve chamber 82, a pressure is exerted on the chamber side of the piston 95 in opposition to the pressure exerted by the regulating spring 99. This pressure continues to build up until it becomes sufficient to force the piston 95 toward the right relieving the pressure on the roller 116 and permitting the supply valve spring 87 to force the rod 118 toward the left pivoting the lever 111 about the pivot pin 112 and moving the supply valve 84 into engagement with its seat 86.

The amount of pressure on the chamber side of the piston 95 necessary to effect sufficient movement of the piston 95 to cause a supply valve 84 to seat is dependent upon the amount of movement of the operating lever 121 and of the plunger 113 from their release positions. The greater the movement of the operating lever 121 from its release position the greater will be the movement of the pivot pin 112 toward the right, and, consequently, the greater will be the compression of the regulating spring 99 necessary to permit movement of the lever and of the rod 118 to effect the seating of the supply valve 84. It will be apparent, therefore, that the brake valve device is self-lapping on a pressure basis, the degree of fluid pressure within the pressure chamber 79 necessary to effect movement of the valve to lap position being dependent upon the degree of movement of the operating lever 121 from its release position.

The degree of movement of the operating lever 121 of the brake valve device 6 from its release position is in turn dependent upon the degree of movement of the cam 25 of the brake controlling device 9 from its release position, for the portion of the sloping surface 286 of the cam 24 that is in engagement with the roller 52. After the handle 20 of the brake controlling device 9 has been moved sufficiently to rotate the cam 24 from the position indicated as release in Fig. 5 to the position represented by the vertical dot and dash line 1, corresponding to the first pneumatic surface zone, the roller 52 will have moved away from the shaft 22 along the entire outwardly sloping surface 286 of the cam 24, and further movement of the handle 20 and of the cam 24 will not effect a further movement of the roller 52, or of the levers 49 and 54 connected by the cable 52 to effect a further movement of the brake valve device 6 by action of the cam 24, until the position indicated by the vertical dot and dash line 3 on Fig. 5 is reached. From the position indicated by the vertical dot and dash line 3 on Fig. 5 to the position indicated by the vertical dot and dash line 4 on Fig. 5, corresponding to the second pneumatic surface zone the roller 52 is moved outwardly by the cam 25 to cause a further clockwise rotation of the levers 49 and 54, and a corresponding further operation of the brake valve device 6 to increase the pressure supplied to the piston chamber 133 of the brake valve device 5.

Fluid under pressure thus supplied to the piston chamber 133 of the relay valve device 5 causes the relay piston 134 to move upwardly carrying the slide valve 136 with it. As the relay piston and the slide valve 136 move upwardly the slide valve laps the release port 144 closing communication from the relay slide valve chamber 137 to the atmosphere. After the port 144 is lapped the end of the piston stem 135 engages the stem 143 of the supply valve 139 and causes this valve to be unseated from its rib seat 145 against the pressure of the spring 141. When the supply valve 139 is unseated fluid under pressure is supplied from the main reservoir 4 through the feed valve device 3 at a reduced pressure, through the main reservoir pipe 10, valve chamber 146, past the unseated valve 139, through slide valve chamber 137 and the brake cylinder pipe 138 to the brake cylinders 1 and 2.

With the relay piston 134 and the slide valve 136 in this position a force is exerted to move the piston and the slide valve away from the supply valve 139, that consists of the pressure within the slide valve chamber 137 plus the pressure of the spring 141. The pressure within the slide valve chamber 137 is not immediately effective against the rear of the piston 134 because of the provision of a phantom piston 291, between which and the piston 134 a chamber 292 is provided that is connected to the slide valve chamber 137 through a restricted opening 293. Upon an increase or decrease in the pressure within the slide valve chamber 137 the flow of fluid under pressure through the opening 293, between the chambers 137 and 292 causes the pressure within the chamber 292 to become equal to that within the chamber 137 after a slight time interval. When the pressure in the chamber 292 builds up to substantially the pressure on the face of the piston 134 as supplied to the application and release pipe 8, the piston is moved away from the supply valve 139 by spring 141 sufficiently to permit it to seat and cut off communication between the main reservoir pipe 10 and the brake cylinders 1 and 2. When the supply valve 139 is seated, the spring 141 is no longer effective to force the valve stem 143 against the piston stem 145 so that the piston 134 and the slide valve 136 do not move further or sufficiently to unlap the exhaust port 144. Fluid under pressure is therefore retained in the valve chamber 137 and in the brake cylinders 1 and 2 that is substantially equal to the pressure in the application and release pipe 8.

The magnetic track brake is applied upon movement of the controller drum 21 sufficiently to cause engagement of the conducting segment 27 with the contact members 28 and 29 and the engagement of the conducting segment 26 with the contact members 31 and 32. Engagement of the conducting segment 27 with the contact members 28 and 29 closes a circuit from the positive terminal of the battery 225, through conductor 294, contact member 28, conducting segment 27, contact member 29, conductor 295, the winding of the magnet 221 of the track shoe lifting magnetic valve devices 207 and 211, conductors 296 and 297 to the negative terminal of the battery 225. The magnet 221, thus energized, forces the valves 218 and 219 downwardly against the bias of a spring 224, to close communication from the main reservoir pipe 10 through pipe 216 to the pressure chamber 212 of the magnetic track brake cylinders 208 and 209 and effect communication from the chamber 212 to the atmosphere through valve chamber 217, past the unseated release valve 218 through the exhaust port 222. The weight of the track shoes thus forces the track shoes downwardly into engagement with the track rail 206.

Upon engagement of the conducting segment 26 with the contact members 31 and 32 a circuit is completed for energizing the windings of the magnetic track shoes extending from the overhead line conductor 228, through conductor 301, conductor 302, the contact member 31, the conducting segment 26, the contact member 32, the several sections of the resistor 303, conductor 304 and 305 to the windings of the magnetic track shoe brakes 15, 16, 17 and 18, and by conductor 306 to ground at 307. As the controller drum 21 is moved from the position indicated by the vertical dot and dash line 2 in Fig. 5 to the position indicated by the vertical dot and dash line 3, the contact members 33, 34, 35, 36 and 37 are brought successively into engagement with the conducting segment 26 to shunt increasing portions of the resistor 303 from the circuit for energizing the magnetic track shoes, thus progressively increasing the degree of energization thereof.

After the handle 20 has been moved to a brake applying position the degree of application of the several braking means increases, and the rate of retardation of the vehicle correspondingly increases, thus biasing the pendulum 147 of the retardation controller device 12 from its vertical position towards the left against the spring pressed plunger 149 to exert a force depending upon the rate of retardation of the vehicle. Upon a predetermined minimum rate of retardation of the vehicle the contact member 151 engages the contact member 152 to close a circuit for energizing the winding of the application magnet valve device 13, to cause operation thereof to cut off the supply of fluid under pressure to the piston chamber 133 of the relay valve device 5, thus preventing a further increase in the degree of application of the brakes. This circuit extends from the positive terminal of the battery 225, through conductor 308, contact members 151 and 152 of the retardation controller, conductor 309, the winding of the magnet 189 of the application magnet valve device 13, and by conductor 311 to the negative terminal of the battery 225. The energization of the magnet valve device 13 causes the valve 187 to be forced downwardly from its upper seat against its lower seat, cutting off communication between the valve chamber 186 and the chamber 185 to prevent the further flow of fluid from pipe 8 through application and release pipe 7 to the piston chamber 133.

Upon a further predetermined increase in the rate of retardation of the vehicle the pendulum 147 will be moved sufficiently further from its vertical position to cause the contact member 151 to engage the contact member 153 and close a circuit for energizing the winding of the release magnet valve device 14 to effect the release of fluid under pressure from the piston chamber 133 of the relay valve device 5. This circuit extends from the positive terminal of the battery 225 through conductor 308, the contact members 151 and 153 of the retardation controller, conductor 312, the winding of the magnet 196 of the application magnet valve device 14, and by conductor 311 to the negative terminal of the battery 225. Upon the energization of the winding of the release magnet valve device 14, the release valve 193 is forced downwardly from its seat to permit the release of fluid under pressure from the chamber 133 of the relay valve device 5 to the atmosphere through the pressure reducing valve device 184. The valve device 184 comprises a ball valve 190 that is pressed to its seat 200 by a spring 210 and is effective to prevent the release of fluid under pressure below a predetermined value.

If the operator desires a rate of retardation during service application of the brakes that is greater than the minimum setting of the retardation controller device 12, the handle 174 is moved in a direction to cause the lower end of the lever 165 to move inwardly against the cap 162 to thus increase the pressure on the springs 157, 158, and 164, thus increasing the force of inertia necessary to be exerted by the pendulum 147 to cause the contact member 151 to engage the contact members 152 and 153.

If the operator now wishes to release the brakes, the brake controller handle 20 is moved to its release position, thus operating the cam 25 to permit movement of the lever 49 in a counterclockwise direction to its release position under the influence of the spring 56. Simultaneously the cam 24 is moved toward the face of the roller 59 to force the lever 58 in a clockwise direction against the force of the spring 71. At the same time the contact segment 27 will move out of engagement with the conducting fingers 28 and 29 and the contact segment 26 will move out of engagement with the contact fingers 31 to 37 inclusive.

Upon movement of the lever 54 in a counterclockwise direction to its release position the lever 121 is likewise moved in a counterclockwise direction and the plunger 133 is moved toward the left, permitting the supply valve 84 to be moved against its seat 86 by the spring 87 to cut off communication between the main reservoir pipe 10 and the pressure chamber 79. The movement of the plunger 113 toward the left permits the release valve 102 to be moved by the release valve spring 108 from engagement with its seat 103, thus effecting communication from the piston chamber 133 of the relay valve device 5 through the application and release pipe 8 and a supply pipe 7, the pressure chamber 79, the passage 101, the release valve chamber 100, the passage 104, the chamber 97, and the exhaust passage and pipe 98 to the atmosphere.

As the pressure within the piston chamber 133 of the relay valve device 5 decreases the pressure within the slide valve chamber 137 forces the piston 134 downwardly causing the slide valve 136 to be moved to unlap the exhaust port 144 and permit the flow of fluid under pressure from the brake cylinders 1 and 2 through brake cylinder pipe 138, slide valve chamber 137, and the exhaust port 144.

If the operator wishes to make an emergency application of the brakes the handle 20 of the brake controlling device 9 is moved an extreme amount from its release position, or until the portion of the face of the cam 23 indicated by the surface 314 in Fig. 5 engages the step 46 of the emergency valve stem 46 forcing the valve 42 from its seat against the bias of the spring 41, thus releasing fluid under pressure from the safety control pipe 11 through the exhaust port 45 to the atmosphere. The resulting reduction in safety control pipe pressure effects a corresponding reduction in pressure in the piston chamber 131 of the emergency portion of the brake valve device 6, thus causing the rod 126 and the block 125 to be moved toward the left by the force of the spring 132. The block 125 engages the lower end of the lever 121 causing it to rotate above the shaft 55 in a clockwise direction and force the plunger 113 toward the right to effect an application of the fluid pressure brakes in the manner above described. The reduction in safety control pipe pressure also effects a reduction in the pressure in the chamber 181 of the retardation controller, thus permitting the spring 182 to force the stem 178 and the lever 175 toward the right to move the cap 161 toward the right against the bias of the springs 157 and 158 and 164 to give the retardation controller device 12 a setting corresponding to a maximum permissible rate of retardation of the vehicle.

If the emergency application of the brakes is effected by movement of the handle 20 of the brake controller device 9 to its emergency position, the energization of the windings of the magnets 221 of the track shoe lifting magnetic valve devices 207 and 211 will be energized through the contact segment 27, and the winding of the track shoe magnets 15, 16, 17 and 18 will be energized through the contact segment 26 of the drum 21, in the manner above described for service application of the brakes.

A reduction in safety control pipe pressure to effect an emergency application of the brakes also effects a reduction in the pressure of the piston chamber 229 of the automatic pressure operated switch devices 226 and 227, thus permitting the springs 234 thereof to force the pistons 231 and the contact members 233 thereof downwardly to circuit closing position. The pressure operated switch devices 226 and 227 control the operation of the track shoe brakes independently of the position of the handle 20 of the brake controller 9, and effect a maximum degree of application of the track shoe brakes upon a reduction in safety control pipe pressure for any reason, such, for example, as operation of the conductor's valves 238, or the braking of the safety control pipe.

Upon operation of the switch device 226 to its circuit closing position a circuit is completed from the positive terminal of the battery 225 through conductor 308, conductor 313, the contact member 233 of the switch 226, conductor 314, conductor 295, the winding of the magnets 221 of the magnet valve devices 207 and 211, conductors 296 and 297 to the negative terminal of the battery 225. Upon operation of the switch device 227 to its circuit closing position a circuit is completed from the overhead line conductor 228 through conductor 301, the contact member 233 of the pressure operated switch device 227, through conductor 305, the windings of the several track shoe brakes 15, 16, 17 and 18 and conductor 306 to ground at 307. The magnet track shoes are thus lowered into engagement with the rails 206 and energized to their maximum amount.

An emergency application of the brakes is effected by a reduction in safety control pipe pressure through operation of the deadman equipment, if the operator relieves pressure from the handle 239 of the controller handle device 235 and from the lever 262 of the foot operated diaphragm valve device 236 at the same time. Such operation is not effected providing pressure is maintained either on the lever 262 or on the handle 239 or if a service application of the brakes has been initiated that has increased the brake cylinder pressure to a relatively low value, sufficient to produce a pressure in the chamber 268 of the cut-off valve device 237 that will force the diaphragm valve 264 to its seat and close communication between the chambers 265 and 266.

If the cut-off valve device 237 is in the illustrated position, corresponding to the release position for the brake equipment, safety control pipe pressure extends from the safety control pipe 11 through the chambers 265 and 266 of the cut-off valve device 237 through pipe 261 to the chamber 259 of the foot valve device 236. So long as pressure is maintained on the lever 262 of the foot valve device, the diaphragm valve 257 is maintained against its seat 258, thus preventing the flow of fluid under pressure from the safety control pipe 11. If pressure is released from the lever 262 the spring 263 forces the lever upwardly and the pressure on the diaphragm valve 257 forces the valve from its seat, thus permitting the safety control pipe pressure to extend through the pipe 253 to the pilot valve chamber 251 of the controller handle device 235. As long as pressure is maintained on the handle 239 the various parts of the controller handle device 235 will remain in their illustrated positions, the pilot valve 248 being maintained against its lower seat by the spring 249 thus preventing the release of safety control pipe pressure to the atmosphere through the exhaust port 252. Should, however, pressure be relieved from the handle 239 while pressure is also relieved from the lever 262 of the foot valve device, fluid under pressure will flow from the safety control pipe through the above traced pipe line, and to the atmosphere through the exhaust port 252.

As brake cylinder pressure builds up, fluid under pressure flows from the brake cylinder pipe 138 to the chamber 274 in the cut-off valve device until the pressure below the valve 269 has become sufficient to move the valve upwardly to its upper seat 273 against the force of the spring 271 thus closing communication from the chamber 268 to the atmosphere and effecting a pressure within the chamber 268 corresponding to brake cylinder pressure to force the diaphragm 267 and the valve 264 downwardly to cut off communication between the safety control pipe 11 and the pipe 261. The cut-off valve device 237 is so adjusted as to close communication between the safety control pipe 11 and the pipe 261 upon an increase in brake cylinder pressure to a value corresponding to a moderate service application of the brakes, say 20 pounds brake cylinder pressure. The operator may, therefore, after effecting such a moderate service application of the brakes, release pressure both from the handle 239 of the controller handle device 235 and from the lever 262 of the foot valve device 236 without effecting an emergency application of the brakes.

While one preferred embodiment of my invention has been illustrated and described it will be apparent to those skilled in the art that many modifications and changes in the apparatus and circuit illustrated may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, an electric track shoe braking means, a manually operable device for controlling the supply of fluid under pressure to said brake cylinder and the application and release of said track shoe braking means, a safety control pipe normally charged with fluid under pressure through a passage in said manually operable device, means responsive to a predetermined reduction in safety control pipe pressure for effecting the supply of fluid under pressure to said brake cylinder, electric circuit control means responsive to a predetermined reduction in safety control pipe pressure for effecting an emergency application of said track shoe braking means, and valve means in said manually operable device for closing the passage through which said safety control pipe is charged and for releasing fluid under pressure from said safety control pipe.

2. In a brake equipment for vehicles, in combination, a fluid pressure braking means, an electric track shoe braking means, manually operable means for controlling the application and release of said several braking means, a safety control pipe normally charged with fluid under pressure through a passage in said manually operable device, means responsive to the venting of fluid under pressure from said safety control pipe for effecting an emergency application of the brakes, valve means in said manually operable device for closing the passage through which said safety control pipe is charged and for releasing fluid under pressure from said safety control pipe, deadman devices subject to pressure by the operator and operative upon the release of such pressure for venting fluid under pressure from the safety control pipe, and means effective upon a predetermined service application of the brakes for preventing the release of fluid under pressure from said safety control pipe through said deadman devices.

3. In a brake equipment for vehicles, in combination, a fluid pressure braking means, an electric track shoe braking means, manually operable means for controlling the application and release of said several braking means, a safety control pipe normally charged with fluid under pressure through a passage in said manually operable device, valve means in said manually operable device for closing the passage through which said safety control pipe is charged and for releasing fluid under pressure from said safety control pipe, means responsive to the release of fluid under pressure from said safety control pipe for effecting an emergency application of said several brakes, and deadman devices subject to pressure by the operator and operative upon the release of such pressure for venting fluid under pressure from said safety control pipe.

4. In a brake equipment for vehicles, in combination, a fluid pressure braking means, magnetic track braking means, a manually operable device for controlling the application and release of said several braking means, a safety control pipe and means responsive to a predetermined reduction in safety control pipe pressure to effect an emergency application of the brakes, said manually operable device being provided with a passage through which said safety control pipe is normally charged, and means effective upon continuing movement from its release position to progressively effect a gradual application of the fluid pressure braking means to a predetermined value, a gradual application of the magnetic braking means, a further application of the fluid pressure braking means, a closure of the passage through which said safety control pipe is charged, and the release of fluid under pressure from said safety control pipe to effect an emergency application of the brakes.

5. In a brake equipment for vehicles, in combination, a fluid pressure braking means including a self-lapping brake valve, biasing means for urging said brake valve to one extreme position, a brake valve controlling device for actuating said brake valve device against the pressure of said biasing means comprising a movable shaft having a cam and lever actuated thereby and operatively connected to said self-lapping brake valve, a second cam on said shaft, and biasing means on said brake valve controlling device actuated by said second cam for substantially neutralizing the effect of said first named biasing means on said controlling device.

6. In a brake equipment for vehicles, in combination, a fluid pressure braking means including a brake valve device, biasing means for urging said brake valve device to one extreme position, a brake valve controlling device for actuating said brake valve device against the pressure of said biasing means comprising a shaft provided with two cam faces and means for operating said brake valve device in accordance with the movement of one of said cam faces, and biasing means operated by the other cam face for substantially neutralizing the effect of said first named biasing means on said controlling device.

7. In a brake equipment for vehicles, in combination, a fluid pressure braking means including a brake valve device, biasing means for urging said brake valve device to one extreme position, a brake valve controlling device provided with a cam operated mechanism for actuating said brake valve device against the pressure of said biasing means, and with a second cam operated mechanism having a biasing means, said two mechanisms being so arranged that the effect of the two mentioned biasing means acts on said brake valve controlling device to neutralize the resistance to movement thereof by the operator.

8. In a brake equipment for vehicles, in combination, a fluid pressure braking means including a brake valve device, biasing means for urging said brake valve device to one extreme position, a brake valve controlling device provided with a cam operated mechanism for actuating said brake valve device against the pressure of said biasing means, and provided with a second cam operated mechanism having a biasing means, said two mechanisms being so arranged that the force of one of said biasing means increases while the force of the other of said biasing means decreases so that their resultant forces neutralize the resistance offered against movement of said brake valve controlling device by the operator.

9. In a brake equipment for vehicles, in combination, a fluid pressure braking means including a brake valve device, biasing means for urging said brake valve device to one extreme position, a brake valve controlling device provided with a cam operated lever for actuating said brake valve device against the pressure of said biasing means, and provided with a second cam operated lever having a biasing means for resisting operation thereof by said cam, said two cam operated levers being so arranged that the effect of one of said biasing means increases as the effect of the other decreases, thus neutralizing the resistance to movement of said brake valve controlling device by the operator.

10. In a brake equipment for vehicles, in combination, a fluid pressure braking means, an electrical braking means, manually operable means for controlling the application and release of said several braking means comprising a brake valve device and biasing means for urging said brake valve device to one extreme position, and a brake valve controlling device provided with a cam operated mechanism for actuating said brake valve device against the pressure of said biasing means, and with a second cam operated mechanism having a biasing means, said two mechanisms being so arranged that the action of said two mentioned biasing means on said brake valve controlling device neutralizes the resistance to movement thereof by the operator, a retardation controller responsive to the rate of deceleration of the vehicle for regulating the degree of application of said braking means, means manually operable at the will of the operator for adjusting the setting of said retardation controller to effect a desired rate of retardation of the vehicle during service application of the brakes, and means automatically operable to vary the setting of the retardation controller to effect an increase in the rate of retardation of the vehicle upon an emergency application of the brakes.

11. In a brake equipment for vehicles, in combination, a fluid pressure braking means, an electrical braking means, manually operable means for controlling the application and release of said several braking means comprising a brake valve device for controlling the supply and release of fluid under pressure to said fluid pressure braking means, and biasing means for urging said brake valve device to one extreme position, and a brake valve controlling device provided with electrical contact making means for controlling the application and release of said electrical braking means and provided with a cam operated mechanism for operating said brake valve device against the pressure of said first named biasing means, and provided with a second cam operated mechanism having a biasing means, said two mechanisms being so arranged that the action of said two mentioned biasing means on said brake valve controlling device neutralizes the resistance to movement thereof by the operator.

12. In a braking equipment for vehicles, in combination, a fluid pressure braking means, and electrically operated braking means, manually operable means for controlling the application and release of said several braking means comprising a brake valve device and biasing means for urging said brake valve device to one extreme position, a brake valve controlling device provided with a cam operated mechanism for actuating said brake valve device against the pressure of said biasing means, and with a second cam operated mechanism having a biasing means, said two cam operated mechanisms being so arranged that the action of said two mentioned biasing means on said brake valve controlling device neutralizes the resistance to movement thereof by the operator, a retardation controller responsive to the rate of deceleration of the vehicle for regulating the degree of application of one said braking means, a safety control pipe, means for normally charging said safety control pipe to a predetermined pressure including a valve control passage in said manually operable device, and means effective upon a reduction in safety control pipe pressure for effecting an emergency operation of said brake and for automatically increasing the rate of retardation of the vehicle by a fixed amount above its service rate of retardation.

13. In a brake equipment for vehicles, in combination, a fluid pressure braking means including a self-lapping brake valve, biasing means for urging said brake valve to one extreme position, a brake valve controlling device for actuating said brake valve device against the pressure of said biasing means comprising a movable shaft having a cam and lever actuated thereby and operatively connected to said self-lapping brake valve, a second cam on said shaft and biasing means on said brake valve controlling device actuated by said second cam for substantially neutralizing the effect of said first named biasing means on said controlling device, and a plurality of electrical braking means also controlled by said brake valve controlling device.

14. In a brake equipment for vehicles, in combination, a fluid pressure braking means including a self lapping brake valve, biasing means for urging said brake valve to one extreme position, a brake valve controlling device for actuating said brake valve device against the pressure of said biasing means comprising a movable shaft having a cam and lever actuated thereby and operatively connected to said self lapping brake valve, a second cam on said shaft and biasing means on said brake valve controlling device actuated by said second cam for substantially neutralizing the effect of said first named biasing means on said controlling device, a plurality of electrical braking means also controlled by said brake valve controlling device and a retardation controller device responsive to the rate of retardation of the vehicle for controlling the degree of application of the fluid pressure braking means only.

ELLIS E. HEWITT.